United States Patent [19]

Mietzel

[11] Patent Number: 5,451,184
[45] Date of Patent: Sep. 19, 1995

[54] CORN HUSKER ROLLS WITH AUGER RELIEF

[75] Inventor: Dennis O. Mietzel, Columbus, Wis.

[73] Assignee: Hughes Company, Inc., Columbus, Wis.

[21] Appl. No.: 191,098

[22] Filed: Feb. 3, 1994

[51] Int. Cl.⁶ ............................................. A01F 11/06
[52] U.S. Cl. ....................................... 460/32; 460/35; 56/16.4 C
[58] Field of Search ................... 460/32, 31, 33, 27, 460/28, 29, 30, 34, 35, 36, 37; 56/16.4 B, 16.4 C

[56] References Cited

U.S. PATENT DOCUMENTS

| | | |
|---|---|---|
| 135,841 | 2/1873 | Philip . |
| 729,438 | 5/1903 | Steel . |
| 773,664 | 11/1904 | Moore . |
| 1,002,530 | 9/1911 | Legg . |
| 2,037,661 | 4/1936 | Knight ........................... 130/5 |
| 2,180,594 | 11/1939 | Kuhlman ........................ 130/5 |
| 2,418,700 | 4/1947 | Davies ............................ 130/5 |
| 2,489,495 | 11/1949 | Morral et al. ................. 56/104 |
| 2,589,841 | 3/1952 | Miller ............................. 130/5 |
| 2,610,634 | 9/1952 | Beck et al. ..................... 130/5 |
| 2,737,185 | 3/1956 | Siemen .......................... 130/5 |
| 4,625,735 | 12/1986 | Anderson et al. ............. 130/5 |
| 4,807,645 | 2/1989 | Mietzel et al. ................. 130/5 |

FOREIGN PATENT DOCUMENTS

602926 8/1960 Canada .

Primary Examiner—Terry Lee Melius
Attorney, Agent, or Firm—Lathrop & Clark

[57] ABSTRACT

An apparatus for removing the husks from ears of corn has axially extending rotatable molded rubber rolls. Each roll has a plurality of aligned axially extending flights which protrude from a cylindrical base segment. The flights may extend exclusively axially, or may extend circumferentially as well to define a segment of a helix. The flights of adjacent rolls are meshed with one another, and the rolls are rotated toward one another to engage husks therebetween. Portions of one or both rolls define a helical recess which extends the length of a roll. A continuous rib may extend from the base segment and is aligned between two flights and extends above the base segment, the rib extends through the helical recess, and engages husks within the recess of an adjacent roll. The continuous rib may be internally reinforced with a metal blade. The roll recesses provide relief for larger diameter trash and stalks, alleviating the flexing of the roll axles which might otherwise occur. The helical recesses act as an auger which engages and advances Stalks gripped in the helical recesses and moves them forward at a rate taster than the progress of the ears such that the stalks are either discharged beneath the roll bed or carried along by the recesses to the discharge end of the apparatus.

21 Claims, 6 Drawing Sheets

CORN HUSKER ROLLS WITH AUGER RELIEF

FIELD OF THE INVENTION

This invention relates to agricultural product processing equipment in general, and to apparatus for stripping husks from ears of corn in particular.

BACKGROUND OF THE INVENTION

Harvested ears of corn come from the field sheathed in an enclosing husk, often surrounded by flag leaves, and occasionally still attached to portions of the stalk. For food processing, especially in the preparation of sweet corn for human consumption, all the husk, leaves, and stalk must be removed from the ears containing the edible kernels of corn.

Husking is conventionally achieved by feeding the bulk unhusked corn onto conveyor tables formed of two or more parallel rows of rotating husking rolls. The rolls are typically molded from rubber or other resilient material and have a number of parallel flights. The flights may be gradually inclined to provide auger-like advancement of the ears from the husker infeed to the husker discharge. Alternatively the rolls may have parallel exclusively axially extending flights. In addition to rolls with circular cross sections, husking rolls having mating elliptical cross section rolls are also know. Many configurations of roll surfaces are known, although two types are predominant, roll surfaces which continuously mesh with adjacent rolls, and those which are closely spaced from the adjacent roll.

Meshing flight rolls have the desirable effect of firmly engaging the corn husks for removing them from the ears. However, prior art roll designs while effective at discharging the thin husk material between engaged rolls, may not be able to pass the much thicker stalk without bending the axles on which the rolls are mounted. This axle flex can cause an overtight grip which will not release the stalk, producing a blockage of the flow of ears through the conveyor. In such a case the rolls will turn ineffectively, eventually fraying or wearing away the obstruction, but in the process causing accelerated wear of the rolls, requiring premature replacement of selected roll segments.

What is needed is a configuration of corn husking rolls which continuously advances the input corn ears without blockage or slowdowns, and which can accommodate larger sized stalks and trash to promote a steady and effective throughput of husked ears over a wide range of feed rates.

SUMMARY OF THE INVENTION

The corn husker of this invention has axially extending rotatable molded rubber or other resilient material rolls. Each roll has a plurality of aligned axially extending flights which protrude from a cylindrical base segment. The flights may extend exclusively axially, or may extend circumferentially as well to define a segment of a helix. The flights of adjacent rolls are meshed with one another, and the rolls are rotated toward one another to engage husks therebetween. Portions of one or both rolls define a helical recess which extends the length of a roll. The roll recesses provide relief for larger diameter trash and stalks, alleviating the flexing of the roll axles which might otherwise occur. The recesses serve as a relieved auger which advances gripped material. Stalks gripped in the helical recesses are moved forward at a rate faster than the progress of the ears and are either discharged beneath the roll bed or carried along by the recesses to the discharge end of the apparatus. A continuous rib may extend from the base segment and is aligned between two flights and extends above the base segment, the rib extends through the helical recess, and engages husks within the recess of an adjacent roll. The continuous rib may be internally reinforced with a metal blade.

It is an object of the present invention to provide a corn husker with improved operating efficiency.

It is also an object of the present invention to provide an agricultural product separator adapted to separate both thin leaf-like material and thicker stalk-like material from the desirable product.

It is another object of the present invention to provide a corn husker which will throughput ears of corn with minimal blockage or ear buildup.

It is a further object of this invention to provide a corn husking roll assembly for a corn husker which will tolerate increased throughput of ears.

It is a still further object of the present invention to provide a corn husking roll with means to eject stalks without undue flexing of the roll axles.

It is an additional object of the present invention to provide a corn husking roll which will positively advance corn husks away from the ear.

Further objects, features, and advantages of the invention will be apparent from the following detailed description when taken in conjunction with the accompanying drawings.

DESCRIPTION OF THE PREFERRED EMBODIMENTS

Figure 1:
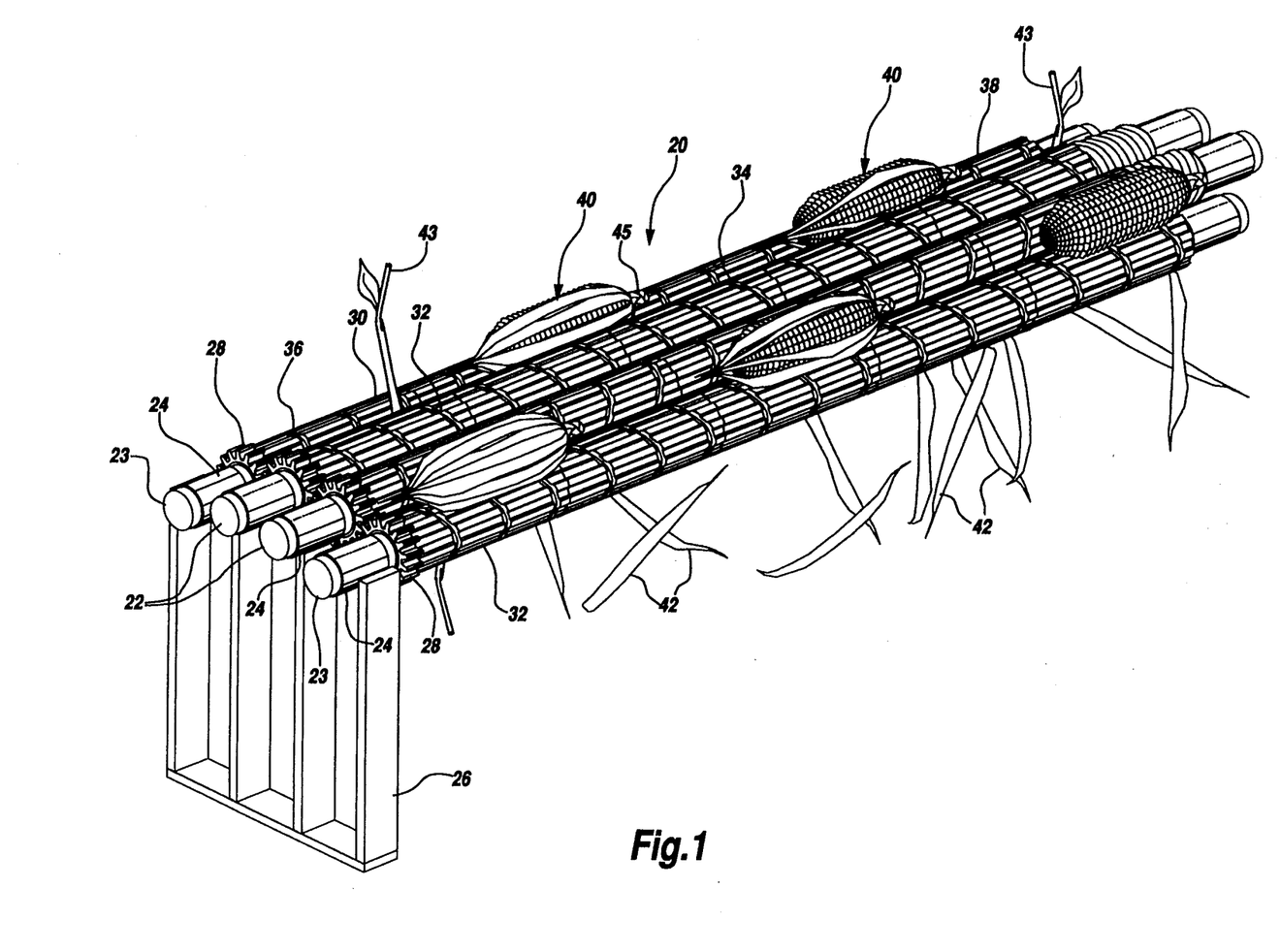
FIG. 1 is an isometric view of the corn husking apparatus of this invention in the process of removing husks from ears of corn.

Referring more particularly to FIGS. 1–10, wherein like numbers refer to similar parts, a corn husking apparatus 20 is shown in FIG. 1. The apparatus 20 has two pairs of rotatable axles 22, 23 which are mounted on bearings 24 which are connected to a frame 26. For clarity only a fragment of the frame 26 has been shown. A gear sprocket 28 is fixed to each axle 22, 23. The sprockets 28 are interengaged and driven by a motor, not shown, at speeds of approximately 300 rpm, although greater or lesser speeds may be utilized depending on particular husking conditions. Within each pair of axles, an upper axle 22 is positioned higher than a lower axle 23. The interengaged sprockets 28 cause each axle 22, 23, to rotate in a direction opposite to its adjoining neighbor. The two upper axles 22 are placed next to one another and rotated to turn toward the two lower axles 23.

Rolls 30, 32 are mounted to each axle 22, 23 to form a conveyor bed 34 with an infeed end 36 adjacent the sprockets 28, and a discharge end 38 opposite the infeed end. In operation, harvested ears 40 are deposited onto the bed 34 at the infeed end 36 and progress along the bed to be discharged for further processing at the discharge end 38. Conventional portions of the frame 26, not shown, enclose the bed and retain the ears thereon. Harvested ears 40 in addition to being sheathed in husks 42, may still have attached stalks 43, and will have protruding shanks 45 which occasionally can become lodged between the rotating rolls. Husks 42 and stalks 43 are engaged by the rolls 30, 32, and are drawn through the bed 34 and hence separated from the ears 40. Typically a conveyor beneath the bed 34 will remove the husks 42 for disposal. It should be noted that the axles will be supported on the frame 26 at the discharge end 38 to permit stalks to be discharged axially between rolls if they will not pass through the bed 34.

As the rolls closest to the infeed end 36 will experience disproportionate wear, each axle 22, 23 is preferably fitted with a plurality of rolls which form a continuous surface for the bed 34. In the apparatus 20, for example, each axle is fitted with five rolls. The rolls 30, 32 are preferably molded from natural rubber of approximately 90 Durometer hardness. Alternatively the rolls may be formed of other appropriate resilient material, such as polyurethane. Although twenty rolls are employed to form the bed 34, there are only two distinct roll types, a left-hand roll 30, and a fight-hand roll 32. The fight-hand rolls 32 are mounted on those axles 22, 23 which turn counter-clockwise when viewed from the infeed end 36, and the left-hand rolls 30 are mounted on those axles 22, 23 which rum clockwise.

Figure 4:
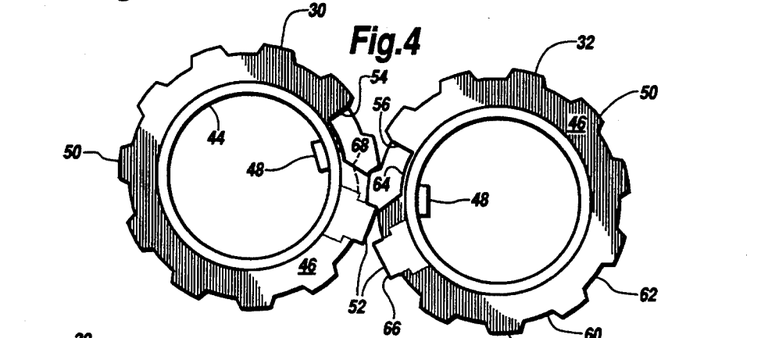
FIG. 4 is a cross-sectional view of the engaged rolls of FIG. 3 shown rotated from the position of FIG. 3.
Figure 5:
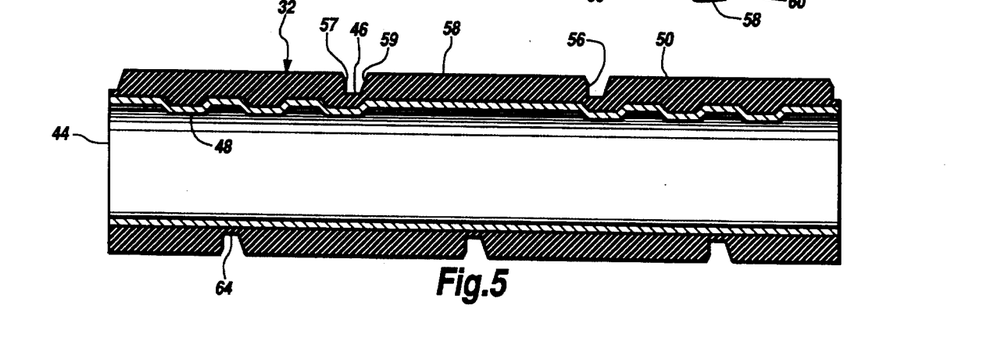
FIG. 5 is a cross-sectional view of a right-hand roll of FIG. 4.

Each roll 30, 32 has a cylindrical steel tube 44 to which a cylindrical rubber base segment 46 is fixed. To assist in locking the tube 44 to an axle, and in securing the base segment 46 to the tube 44, inwardly protruding keys 48, shown in FIGS. 4 and 5, are provided. The locking of the tubes to the axles achieves alignment of the rolls on the axles 22, 23.

Each roll 30, 32, has ten radially outwardly protruding flights 50 and one continuous rib 52 evenly arrayed about the cylindrical base segment 46. A helical recess 54, 56 extends the length of each roll. The recesses 54, 56 provide a relief from the pressure of the engaged rolls 30, 32 when an object substantially thicker than a husk 42 is caught between the rolls. The recesses 54, 56 define a relief auger in which larger thickness objects may be advanced along the bed 34 and prevented from clogging or obstructing the flow of agricultural products over the surface of the bed. The pitch of the helical recesses is chosen to provide a rate of advancement for an object trapped therein which is greater than the rate of advancement of the conveyed product. Thus, far from obstructing the flow of product, a stalk or twig caught in the helical recesses 54, 56 will rapidly move forward to the discharge end carrying along with it preceding agricultural product. The rolls 30, 32 are identical except for the orientation of the helical recess, with the left-hand rolls 30 having a left-hand helical recess 54, and the fight-hand rolls 32 having a right-hand helical recess 56. As shown in FIG. 5, each recess 54, 56 has a side wall 57 toward the inlet end direction of the recess which extends substantially radially. Facing the radial side wall 57 is an inclined recess side wall 59 which is inclined toward the discharge end at an angle of approximately 20.5° with respect to a radial plane.

Figure 2:
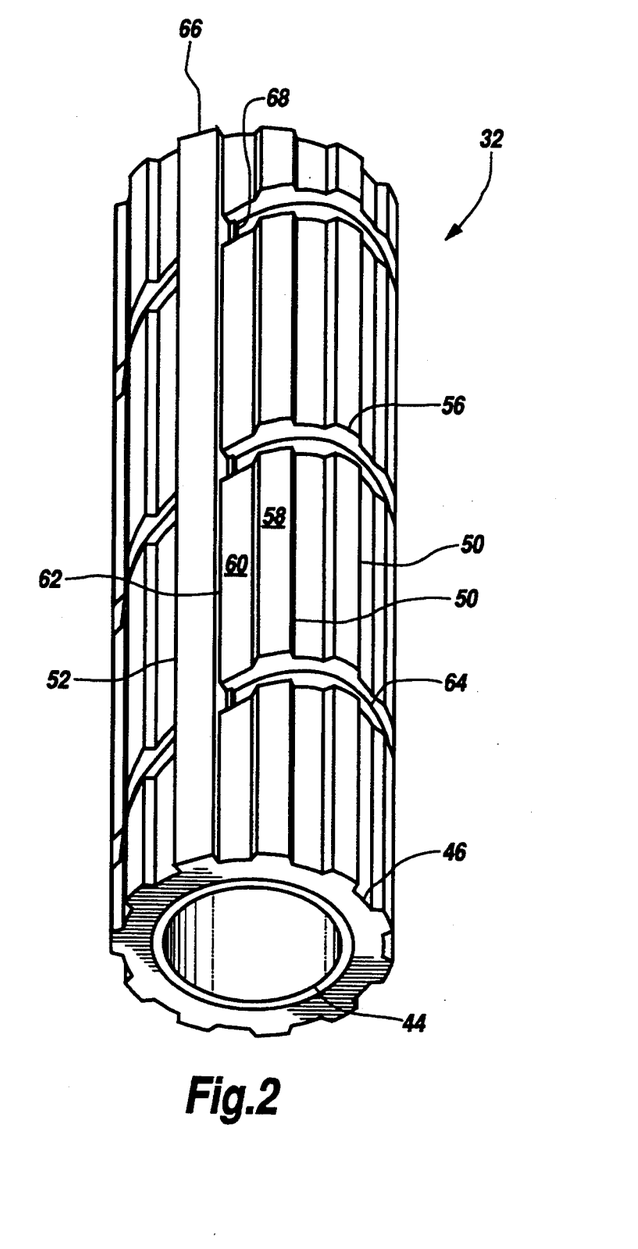
FIG. 2 is an axonometric view of a corn husking roll of the apparatus of FIG. 1.

As shown in FIG. 2, a fight-hand roll 32 has parallel axially extending flights 50. The flights 50 protrude radially and have outermost lands 58 which are spaced above grooves 60 which are defined between neighboring flights 50. The groove lower surfaces 62 correspond to the exterior of the cylindrical base segment 46, which is integrally formed with the flights 50. The grooves 60 and flights 50 are dimensioned such that the left-hand and right-hand rolls 30, 32 may be engaged against one another to intermesh so that the flights 50 of one roll extend into the grooves 60 of a neighboring roll as the two rolls turn against one another. In an exemplary roll 30, 32, the outer diameter is approximately 2.8 inches, and the width of a flight land is approximately 0.31 inches. The length of an exemplary roll is approximately 11.7 inches, and the width of the helical recesses is approximately one quarter inch at the base.

The base segment 46 and the flights 50 have portions which define the helical recess 56. The helical recess 56 cuts across the flights 50 and has a recess floor 64 which is located radially inwardly of the groove lower surfaces 62.

Figure 3:
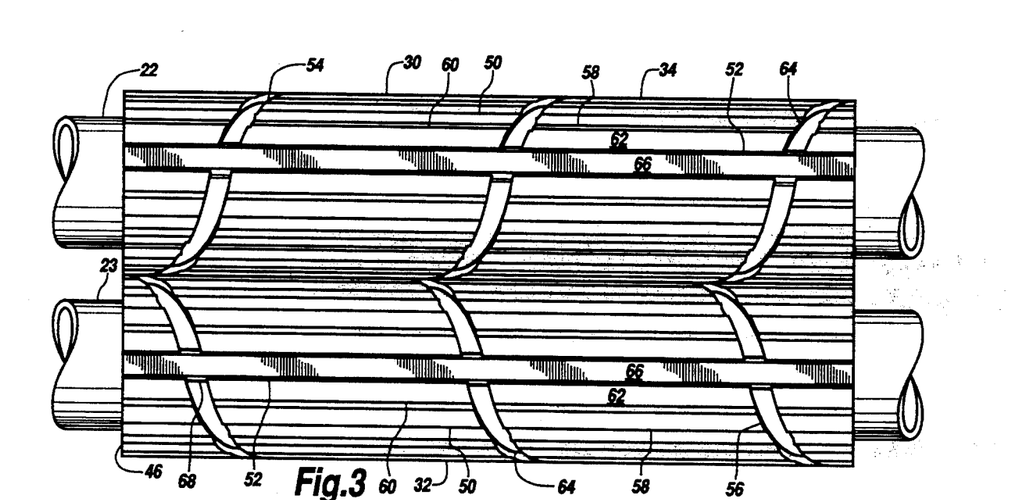
FIG. 3 is a fragmentary top plan view of an engaged left-hand roll and right-hand roll of the apparatus of FIG. 1.

In a preferred embodiment, the helical recesses 54, 56 of adjacent left-hand and right-hand rolls 30, 32 are aligned with each other as shown in FIG. 3. As the rolls 30, 32 rotate toward one another, corn husks 42 are clamped by the intermeshing flights and dragged between the rolls 30, 32. Shanks 43 and trash which are too thick to pass between the meshed flights extend into the helical recesses where they are advanced toward the discharge end and beneath the bed 34. When the two helical recesses 54, 56 are aligned, the effective result is a vertical cavity at the line of contact been the rolls which moves axially toward the discharge end. This cavity is twice the width of a single recess. The continuous ribs once per revolution compress into this cavity and exert a tug on the object contained therein.

To further aid in separating thicker objects from the ears 40, each roll 30, 32 has a continuous rib 52 which occupies a space equivalent to that occupied by a flight but which is not interrupted by a helical recess. The rib 52 extends axially across the recess and has a rib top surface 66 which is spaced radially from the center of the roll approximately the same amount as the lands 58 of the flights 50. To facilitate removal of the roll 30 from the rubber forming mold, the rib 52 is formed at the top of the mold, and has stepped sides 68.

As the rolls 30, 32 turn against one another, the continuous ribs 52 on each roll are, in a preferred embodiment, positioned to engage one above the other, as shown in FIG. 4. The ribs 52 thus serve to clamp an object within the helical recess 54, 56, such as a stalk 43 and to pull the stalk out of the recess straight down to be discharged from the apparatus 20. Because the ribs 52 represent only a small portion of the circumference of the rolls, the effect of the rotating rolls is an intermittent tugging or impact on the object carded in the recesses. This tugging, at the rate of up to three hundred times a minute, advances a stalk, which may be as much as six feet long, vertically downwardly, perhaps only a few inches with each impact, but nonetheless tending to fully discharge the stalk prior to the discharge end of the apparatus 20. A similar effect is produced on protruding shanks 45 of the ears 40. The repeated impact of the rotating fibs 52 will tend to shear off the trapped shank, allowing the ear 40 supported on the bed to progress unhindered. Thus a stalk is mechanically advanced, not along the winding path of the groove on any one roll, but in the cavity defined between the engaged rolls.

It should be noted that the rolls 30, 32 may be positioned so that the continuous ribs 52 are offset from one another by one or more flights 50, thus providing two instances of gripping and pulling by the ribs 52 per revolution of the rolls.

Figure 6:
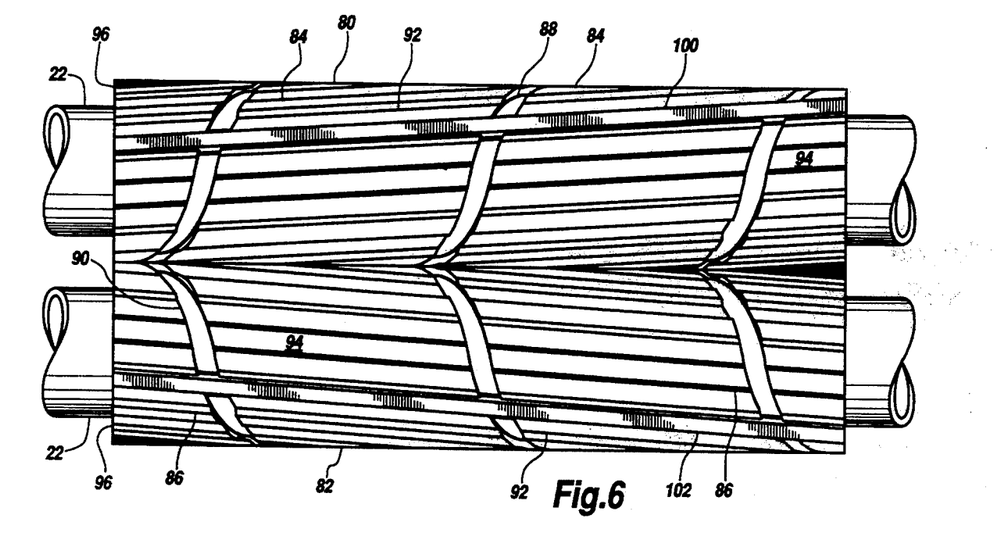
FIG. 6 is a fragmentary top plan view of an alternative embodiment corn husking apparatus of this invention.

As shown in FIG. 6, alternative embodiment rolls 80, 82 are similar to the rolls 30, 32, except the flights 84, 86 define a left-hand helix and a fight-hand helix on the left-hand roll 80 and right-hand roll 82 respectively. The flights 84, 86 describe only a fraction of a turn along the length of the rolls 30, 32, and assist in the advance of ears 40 along a bed of rolls. The rolls 80, 82 have helical recesses 88, 90 which are recessed below the level of the grooves 92 defined between the outward lands 94 of the flights 84, 86. The flights 84, 86 protrude radially from a rubber base segment 96 which is mounted to a cylindrical steel tube.

The rolls 80, 82 each have a continuous rib 100, 102 which is inclined from the axial direction in the same amount as the flights 84, 86, to define a helical rib which engages within a helical groove 92 in an engaged roll.

Figure 7:
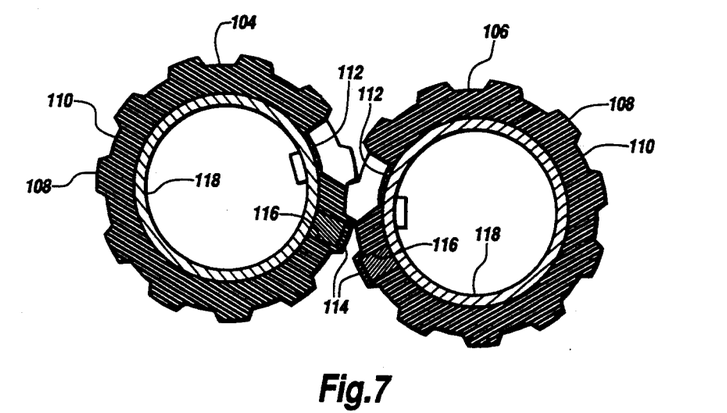
FIG. 7 is a cross-sectional view of engaged rolls of an alternative embodiment husker of the present invention having rolls with reinforced continuous ribs.

Although the rolls 30, 32, 80, 82 are preferably integrally formed of molded rubber and supported on a tubular metal core for reasons of reduced cost, extended wear life of the continuous ribs on the rolls may be obtained by reinforcing the ribs with a steel blade. Alternative embodiment reinforced rib rolls 104, 106 are shown in FIG. 7. The rolls 104, 106 have a plurality of molded rubber flights 108 which extend radially outwardly from the cylindrical base segment 110 of the roll. Each roll has a helical recess 112, which will have a right-hand or a left-hand orientation depending on which roll, 104, 106 it is on. A continuous rib 114 protrudes from the base segment 110 and extends axially across the recess 112. The rib is reinforced by a rectangular parallelepiped blade 116 which is fixed to the internal tube 118, preferably by welding.

In circumstances where non-reinforced rolls are used, it will be expected that rolls adjacent the infeed end will wear at an accelerated pace. When performance deteriorates due to wear, the infeed end rolls may be replaced, leaving the remaining rolls to endure a more extended use life.

Figure 8:
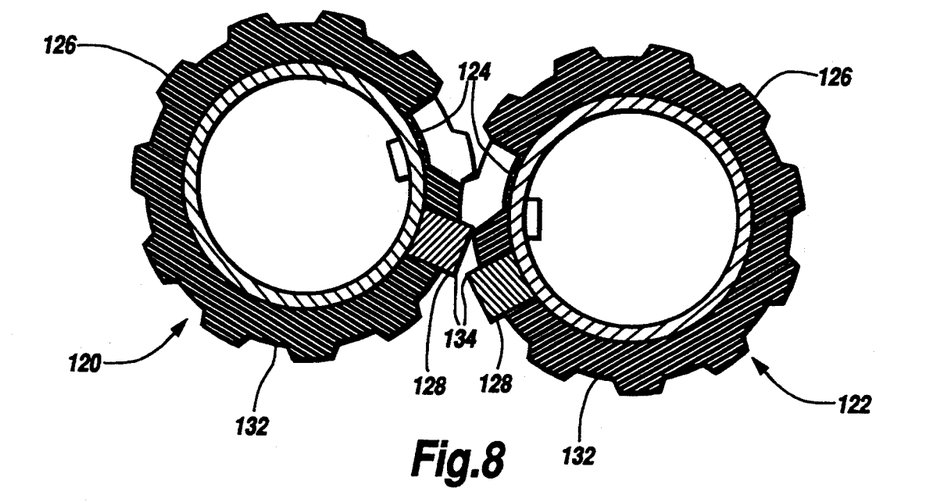
FIG. 8 is a cross-sectional view of engaged rolls of another alternative embodiment husker having all-metal cutting blades.

Another alternative embodiment pair of husking rolls 120, 122 is shown in FIG. 8. The rolls 120, 122 have helical recesses 124 similar to those on the rolls discussed above, as well as a plurality of axially extending flights 126. Solid metal blades 128 are fixed to the metal tube 130 which supports the rubber base segment 132. The blades 128 extend axially and cut across the helical recesses 124. The rolls 120, 122 are preferably oriented with respect to one another so the exposed edges 134 of the blades 128 will cut against one another to sheer a stalk or other trash item caught therebetween.

Figure 9:
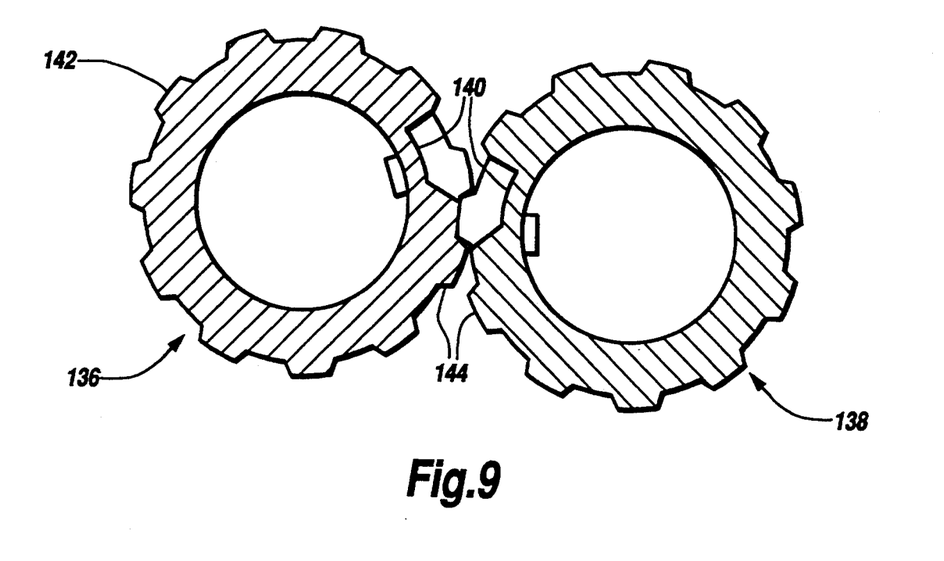
FIG. 9 is a cross-sectional view of all metal engaged rolls of yet another alternative embodiment husker of this invention.

Yet another alternative embodiment pair of husking rolls 136, 138, is shown in FIG. 9. The rolls 136, 138 have helical recesses 140 as well as a plurality of axially extending flights 142. Continuous ribs 144 extend axially and cut across the helical recesses 140. The rolls 136, 138 are formed entirely of metal, preferably steel, and may be cast or machined.

Figure 10:
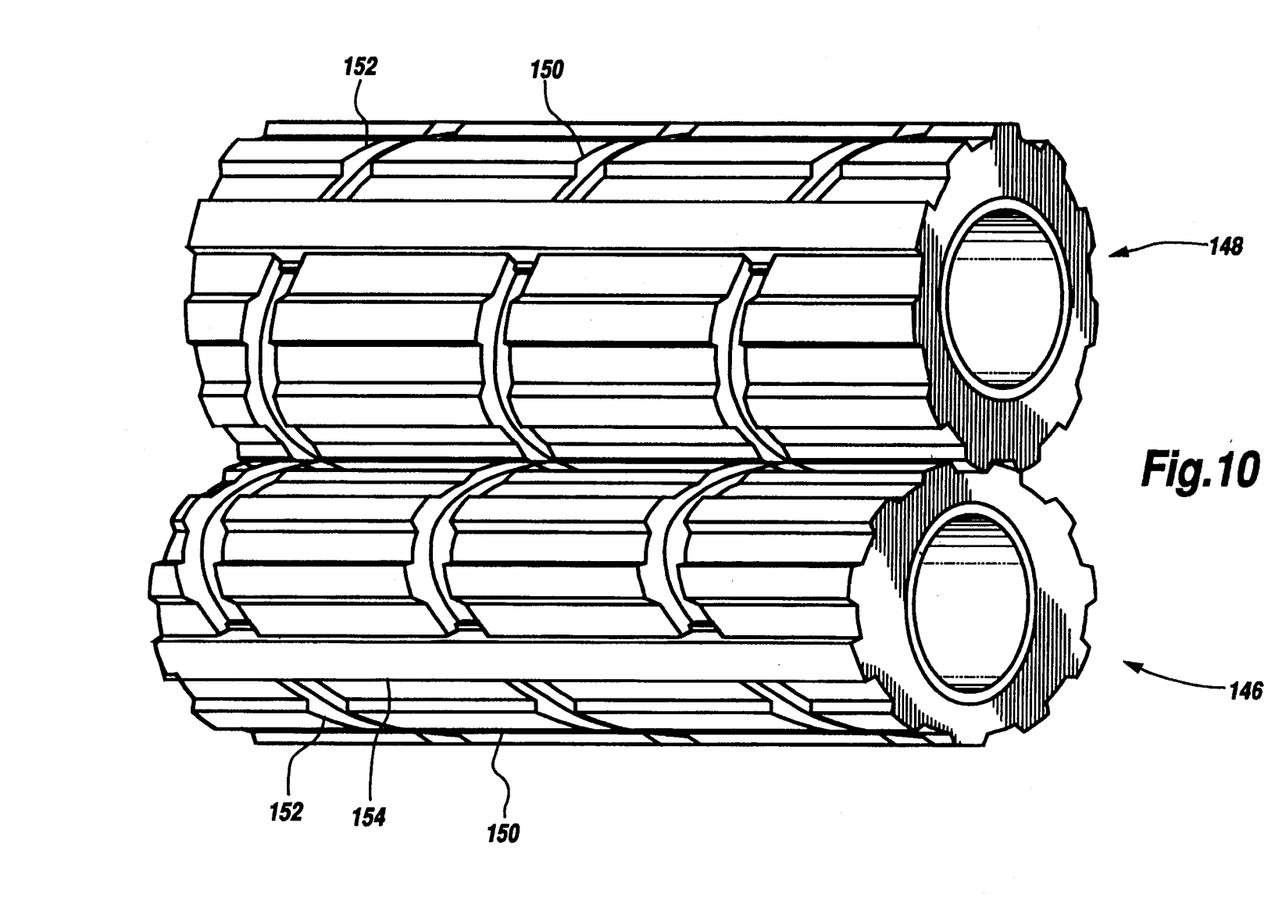
FIG. 10 is a fragmentary perspective view of two engaged elliptical rolls having the auger relief of this invention.

Alternative embodiment rolls 146, 148 of an agitating husker are shown in FIG. 10. Each roll 146, 148 is elliptical in cross-section. The rolls are center mounted on parallel axles so that axial flights 150 mesh, with the rolls mounted substantially perpendicular to one another. Each roll has a generally helical recess 152 which extends the full length of the roll. Although because of the non-cylindrical surface of the rolls 146, 148, the recesses are not strictly geometrically in the shape of a helix, what is meant by helical for purposes of this application is a recess which encircles the roll while also extending axially, to have the effect of a relieved auger. As in the rolls disclosed above, the recesses 152 provide a relieved auger which engages with thicker material such as stalks, shanks, and trash, and advances that material axially. Each roll 146, 148 has a continuous rib 154 which extends axially and cuts across the recess 152. As the elliptical rolls 146, 148 turn the pinch angle between the rolls is constantly changing, this variation agitates the conveyed product and effectively engages the undesirable material.

It should be noted, as indicated above, that the rolls of this invention may also be constructed with other than strictly helical recesses, so long as the recesses progress the material axially.

It should also be noted that although treatment of sweet corn has been presented as an example of the application of the present invention, the device may also be employed for separating husks, stalks, shanks, and trash from seed corn. Furthermore, the apparatus may be employed for removing vines and trash from harvested potatoes or twigs and related trash from citrus or other fruits.

It is understood that the invention is not confined to the particular construction and arrangement of parts herein illustrated and described, but embraces all such modified forms thereof as come within the scope of the following claims.

I claim:

1. An apparatus for removing the husks from ears of corn, comprising:
   a) a frame;
   b) a first roll rotatably mounted to the frame, wherein the first roll has a plurality of radially protruding flights which define outward lands and recessed grooves, and wherein portions of the first roll define a helical recess which extends the length of the roll and which is recessed below the level of the flight grooves; and
   c) a second roll rotatably mounted to the frame parallel to the first roll, wherein the second roll has a plurality of radially protruding flights which define outward lands and recessed grooves, and wherein the first roll is engaged against the second roll such that portions of the flights of the first roll mesh with portions of the flights of the second roll as the rolls are rotated toward one another to progressively engage corn husks of ears of corn disposed upon the rolls.

2. The apparatus of claim 1 wherein the first roll has at least one continuous rib which is aligned between two neighboring flights and which extends across the helical recess and which has a top surface which extends above the flight grooves.

3. The apparatus of claim 2 wherein the continuous rib is formed of a resilient material which overlies a metallic insert.

4. The apparatus of claim 2 wherein the first roll is formed entirely of metal.

5. The apparatus of claim 2 wherein the second roll has at least one continuous rib which is substantially parallel to the flights and which extends above the flight grooves, and wherein the continuous rib of the second roll intermittently engages within a groove of the first roll as the rolls are rotated.

6. The apparatus of claim 1 wherein the second roll has portions which define a helical recess which extends the length of the roll and which is recessed below the level of the flight grooves.

7. The apparatus of claim 6 wherein the first roll has a left-hand helical recess and the second roll has a right-hand helical recess.

8. The apparatus of claim 1 wherein the flights of the first roll and the second roll extend substantially axially along the length of the rolls.

9. The apparatus of claim 1 wherein the flights of the first roll define a protruding helical path, and the flights of the second roll also define a protruding helical path.

10. The apparatus of claim 1 wherein the first roll has a substantially elliptical cross section, and wherein the second roll has a substantially elliptical cross section.

11. A roll for an agricultural product separating apparatus, the roll comprising:
   a) an axially extending cylindrical base segment;
   b) a plurality of axially extending flights which protrude from the cylindrical base segment, wherein the flights have radially outward lands and grooves defined by the cylindrical base segment;
   c) portions of the cylindrical base segment and the flights which define a helically extending recess, wherein the recess cuts across the flights and extends radially below the level of the flight grooves, wherein the helically extending recess provides a relief between the meshed flights of two engaged rolls to facilitate the axial advancement of material clasped between two rolls; and
   d) a continuous rib which extends the length of the roll and which protrudes from the base segment, wherein the rib extends above the recessed grooves and into the helically extending recess and is positioned between two axially extending flights.

12. The apparatus of claim 11 wherein the base segment is formed of a resilient material, and wherein the continuous rib is formed of a resilient material which overlies a metallic insert.

13. The apparatus of claim 11 wherein the flights of the roll extend substantially axially along the length of the base segment.

14. The apparatus of claim 11 wherein the flights of the roll define a protruding helical path along the base segment.

15. The roll of claim 11 wherein the continuous rib is formed entirely of metal to define a cutting blade.

16. The roll of claim 11 wherein the entire roll is formed of metal.

17. The apparatus of claim 11 wherein the base segment is substantially elliptical in cross section.

18. A husker roll for a corn husking apparatus, the roll comprising:
   a) an axially extending cylindrical base segment;
   b) a plurality of helical flights which protrude from the cylindrical base segment, wherein the flights have radially outward lands, and wherein recessed grooves are defined between neighboring flights;
   c) portions of the cylindrical base segment and the flights defining a helically extending recess, wherein the recess cuts across the flights and extends radially below the level of the flight grooves; and
   d) a continuous helical rib which extends the length of the roll and which protrudes from the base segment and the recess, wherein the rib extends above the recessed grooves and is positioned between two helical flights.

19. The apparatus of claim 18 wherein the base segment is formed of a resilient material, and wherein the continuous rib is formed of a resilient material which overlies a metallic insert.

20. A roll for an agricultural product separating apparatus, the roll comprising:
   a) an axially extending base segment having an approximately elliptical cross section;
   b) a plurality of axially extending flights which protrude from the base segment, wherein the flights have radially outward lands and grooves defined by the cylindrical base segment;
   c) portions of the base segment and the flights defining a recess which spirals around the base segment, wherein the recess cuts across the flights and extends radially below the level of the flight grooves, and wherein the recess promotes the axial advancement of objects engaged within the recess and another roll.

21. The roll of claim 20 further comprising a continuous rib which extends the length of the roll and which protrudes from the base segment, wherein the rib extends above the recessed grooves and is positioned between two axially extending flights.

* * * * *